(12) United States Patent
Takamatsuya

(10) Patent No.: US 7,447,976 B2
(45) Date of Patent: Nov. 4, 2008

(54) DATA TRANSFER APPARATUS

(75) Inventor: Yoshihiro Takamatsuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 11/191,086

(22) Filed: Jul. 28, 2005

(65) Prior Publication Data

US 2006/0224936 A1    Oct. 5, 2006

(30) Foreign Application Priority Data

Mar. 31, 2005  (JP) .............................. 2005-101185

(51) Int. Cl.
*G11C 29/00* (2006.01)
(52) U.S. Cl. ..................... 714/766; 714/768; 714/775; 714/789; 714/798
(58) Field of Classification Search ................. 714/766, 714/768, 775, 789, 798, 799; 710/33, 306; 370/395.1
See application file for complete search history.

(56) References Cited

U.S. PATENT DOCUMENTS 6,717,947 B1* 4/2004 Ghodrat et al. .......... 370/395.1
6,813,282 B1* 11/2004 Domon ..................... 370/516
6,892,234 B2* 5/2005 Knight ...................... 709/223
7,054,959 B2* 5/2006 Saito et al. .................. 710/33
2003/0235310 A1* 12/2003 Saito et al. .................. 380/281

FOREIGN PATENT DOCUMENTS

| JP | 2001-177746 | 6/2001 |
| JP | 2002-281001 | 9/2002 |
| JP | 2002-281034 | 9/2002 |
| JP | 2004-54504  | 2/2004 |

* cited by examiner

*Primary Examiner*—Guy Lamarre
*Assistant Examiner*—Fritz Alphonse
(74) *Attorney, Agent, or Firm*—Staas & Halsey LLP

(57) ABSTRACT

A data transfer apparatus improving data transfer rate regardless of the original transfer mode in a USB interface is disclosed. A computer includes a bulk packet generation unit and an isochronous packet transmission unit. The bulk packet generation unit generates a bulk packet (or a control packet) which is a USB packet and has a predetermined structure including a first data area by describing data which is taken as an object of transfer in the first data area. The isochronous packet transmission unit generates an isochronous packet which is a packet in USB isochronous transfer and has a predetermined structure including a second data area by incorporating at least one bulk packet into the second data area, and isochronously transfers the isochronous packet to the mobile telephone over the USB interface.

7 Claims, 6 Drawing Sheets

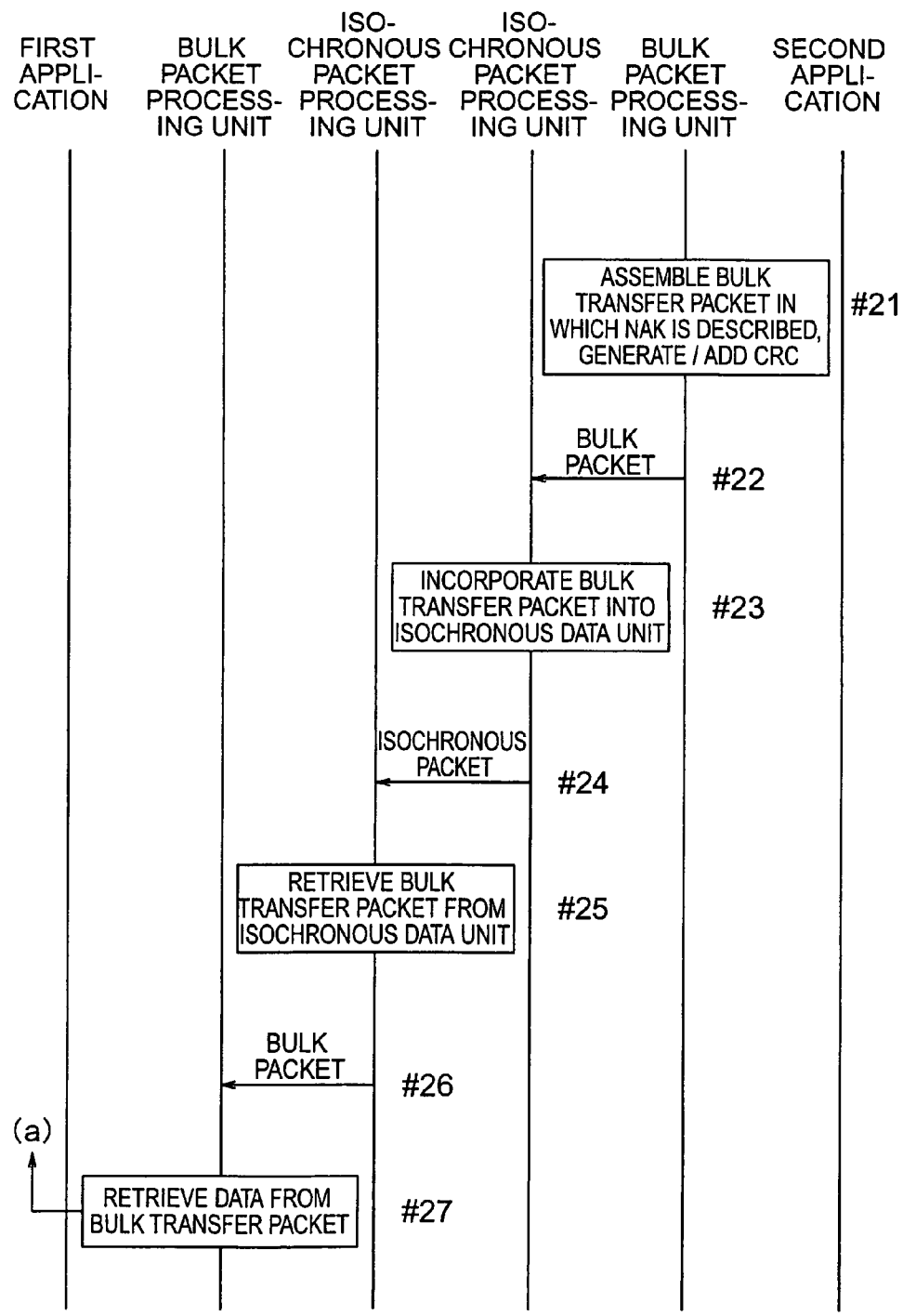

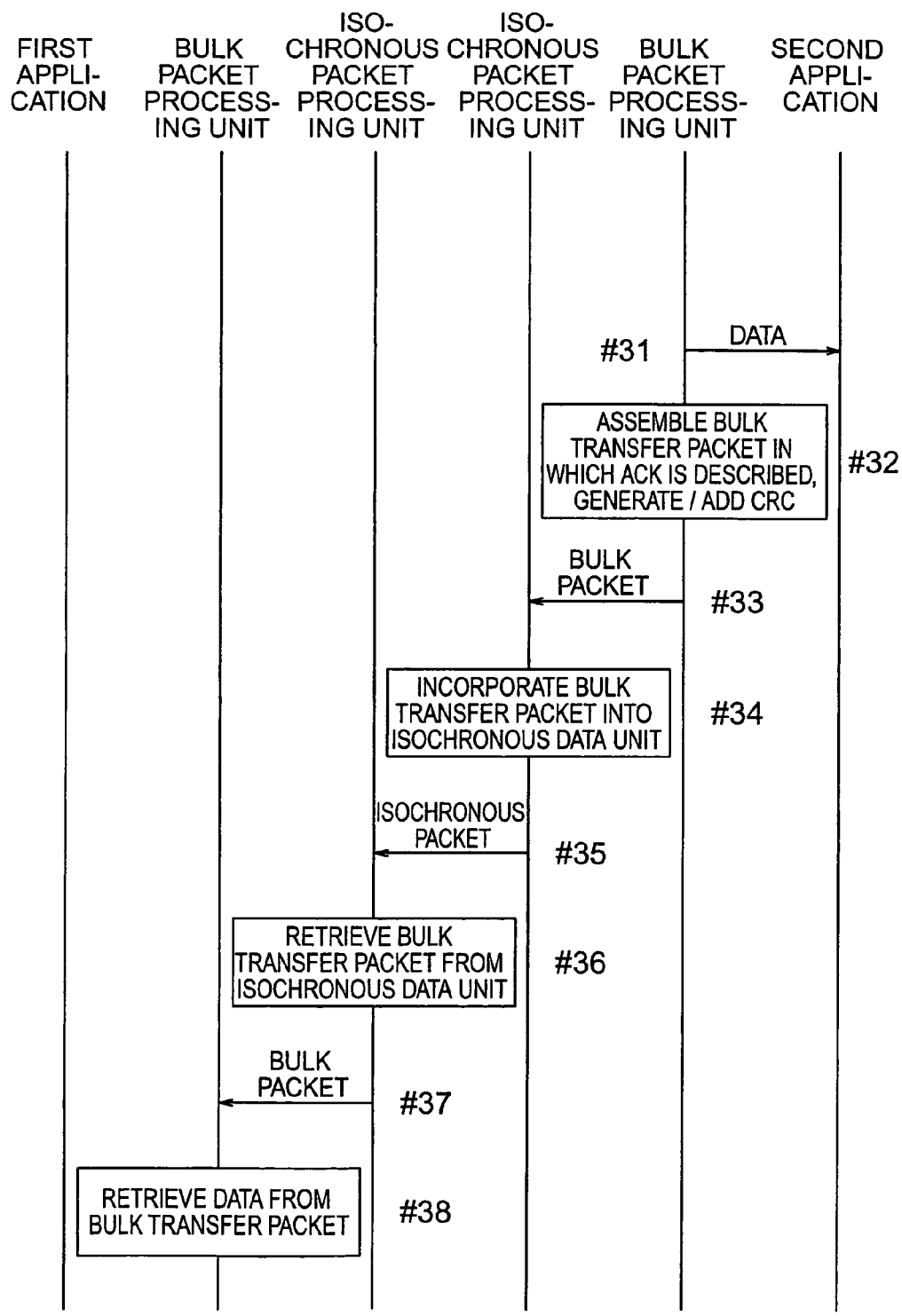

DATA TRANSFER APPARATUS

CROSS-REFERENCE TO RELATED APPLICATIONS

This application claims the conventional priority based on Japanese Patent Application Serial No. 2005-101185, filed on Mar. 31, 2005, the disclosures of which are incorporated herein by reference.

BACKGROUND OF THE INVENTION

1. Field of the Invention

This invention generally relates to a data transfer apparatus, and more specifically to a data transfer apparatus, such as a computer and a mobile telephone, for performing mutual data transfer by connecting over a USB interface.

2. Description of the Related Art

A USB (Universal Serial Bus) interface is widely used because it is capable of unifying connections between a computer and various peripheral devices as one type of interface. The USB interface includes transfer modes such as isochronous transfer, bulk transfer, control transfer, and interrupt transfer. They can be used according to each purpose. For example, since the isochronous transfer has no retransmission method for a data error, it is used in transferring audio data and moving image data, and so on, having no serious influence in a case that 1-bit data loses. The bulk transfer is used by a number of peripheral devices, for example, in transferring a large amount of data using a digital camera, MO, CD-ROM, printer, scanner, etc. The control transfer is used in data transfer using, for example, a mouse.

There is the technology proposed for selectively using the above-mentioned transfer modes of the USB interface depending on the use between a host computer and a digital camera (refer to Japanese Patent Laid-Open No. 2001-177746).

Normally, with the USB interface, each of electronic device is given an opportunity of data transfer once per 1 ms (millisecond). However, when one computer is connected to a plurality of electronic devices using the USB interface (hereinafter referred to as USB devices), the band available for one USB device is reduced. As a result, the following problems occur.

That is, isochronous transfer is assigned a higher priority to guarantee real-time use of audio data, etc. Therefore, a USB device for isochronous transfer is assigned a data transfer opportunity without fail at a constant interval (for example, once per 1 ms). However, the bulk transfer and control transfer are not originally guaranteed a transfer rate. Therefore, when the number of USB devices for isochronously transferring data increases, the data transfer is prioritized, and the USB devices for the bulk transfer and control transfer are hardly given an opportunity of data transfer. Therefore, with a USB device for the bulk transfer and control transfer, the amount of data which is taken as an object of transfer per unit time (for example, 1 ms) decreases, and the USB interface is a bottleneck in data transfer.

In addition to the above-mentioned problem, assuming that the amount of transferred data per packet in the bulk transfer is 64 bytes, and a transfer opportunity is given once (one packet) per 1 ms, only a data transfer rate of 512 kbps (kilobit/second) can be expected. On the other hand, viewed from the USB interface, the opportunity of data transfer is periodically given, but the data transfer seems extremely inefficient, or a restricted data transfer opportunity is to be assigned to extremely inefficient data transfer. These issues apply to the control transfer. On the other hand, the amount of data which is taken as an object of transfer per unit time in a USB device for the bulk transfer or control transfer tends to increase. However, as described above, since a number of peripheral devices perform the bulk transfer, the USB interface is a bottleneck in data transfer in this regard.

SUMMARY OF THE INVENTION

An object of the present invention is to provide a data transfer apparatus capable of improving a data transfer rate regardless of the original transfer mode using the USB interface.

The data transfer apparatus according to the present invention comprises a first unit packet processing unit and a first isochronous packet processing unit. The first unit packet processing unit generates a unit packet which is a USB packet and has a predetermined structure including a first data area by describing data which is taken as an object of transfer in the first data area. The first isochronous packet processing unit generates an isochronous packet which is a packet used in USB isochronous transfer and has a predetermined structure including a second data area by incorporating at least one unit packet into the second data area, and isochronously transfers the isochronous packet over a USB interface.

The data transfer apparatus according to the present invention includes a second isochronous packet processing unit and a second unit packet processing unit. The second isochronous packet processing unit receives an isochronous packet which is a packet isochronously transferred over a USB interface in USB isochronous transfer, and has a predetermined structure including a second data area, and retrieves at least one unit packet incorporated into the second data area. The second unit packet processing unit retrieves data which is taken as an object of transfer from a first data area included in a unit packet which is a USB packet and has a predetermined structure including the first data area.

The data transfer apparatus according to the present invention comprises a first data transfer apparatus, a second data transfer apparatus, and a USB interface for connection between the apparatuses. The first data transfer apparatus further comprises a first unit packet processing unit and a first isochronous packet processing unit. The first unit packet processing unit generates a unit packet which is a USB packet and has a predetermined structure including a first data area by describing data which is taken as an object of transfer in the first data area. The first isochronous packet processing unit generates an isochronous packet which is a packet in USB isochronous transfer and has a predetermined structure including a second data area by incorporating at least one unit packet into the second data area, and isochronously transfers the isochronous packet to the second data transfer apparatus over the USB interface. The second data transfer apparatus further comprises a second isochronous packet processing unit and a second unit packet processing unit. The second isochronous packet processing unit receives the isochronous packet isochronously transferred from the first data transfer apparatus over the USB interface, and retrieves at least one unit packet incorporated into the second data area. The second unit packet processing unit retrieves data which is taken as an object of transfer from the first data area included in the unit packet.

Preferably, in the data transfer apparatus of the present invention, the unit packet further includes a first error check area describing information for an error check of the unit packet. The isochronous packet further includes a second error check area describing information for an error check of the isochronous packet. The second unit packet processing unit makes an error check of the retrieved data which is taken as an object of transfer using information in the first error check area.

Preferably, in the data transfer apparatus of the present invention, the second unit packet processing unit generates a unit packet which is a USB packet and has a predetermined structure including a first data area by describing a result of the error check as data which is taken as an object of transfer in the first data area. The second isochronous packet processing unit generates an isochronous packet which is a packet used in USB isochronous transfer and has a predetermined structure including a second data area by incorporating at least one unit packet generated by the second unit packet processing unit into the second data area, and isochronously transfers the isochronous packet over the USB interface.

The data transfer apparatus of the present invention incorporates a unit packet into a data area of an isochronous packet, and isochronously transfers the isochronous packet. Also the data transfer apparatus of the present invention receives an isochronously transferred isochronous packet, retrieves the unit packet incorporated into the data area, and retrieves data which is taken as an object of transfer from the data area of the unit packet. Additionally, the data transfer apparatus of the present invention incorporates a unit packet into a data area of an isochronous packet, and isochronously transfers the isochronous packet. Then, the data transfer apparatus receives the isochronously transferred packet, retrieves the unit packet incorporated into the data area, and retrieves data which is taken as an object of transfer from the data area of the unit packet.

As described above, the data transfer apparatus of the present invention performs isochronous transfer based on the bulk transfer and control transfer regardless of the original transfer mode in the USB interface, while it is originally a USB device for performing the bulk transfer and control transfer. Since the priority of the isochronous transfer is high, the USB device for performing the isochronous transfer is given a data transfer opportunity at constant intervals. Thus, in a case that the number of USB devices for performing the isochronous transfer increases and it is hard to give a USB device for performing the bulk transfer and control transfer an opportunity of data transfer, an opportunity of data transfer can be obtained certainly at constant intervals (for example, once per ms). Thus, data transfer rate can be guaranteed to some extent.

Additionally, a plurality of packets (unit packets) for the bulk transfer and control transfer can be incorporated into the isochronous packet. Therefore, even a USB device for normally performing the bulk transfer and control transfer can increase the amount of data transfer per unit time (for example, 1 ms). For example, the data transfer rate expected for the bulk transfer is 512 kbps as described above. On the other hand, the amount of data transfer per single isochronous packet is 1024 bytes. Thus, according to the present invention, assuming that one transfer opportunity is given to 1 ms, the maximum data transfer rate of 8 Mbps (megabits/second) can be expected. Therefore, although the amount of data which is taken as an object of transfer per unit time (for example, 1 ms) increases in a USB device for normally performing the bulk transfer and control transfer, sufficient data transfer can be performed. Thus, data transfer at some high rate can be realized.

Preferably, the data transfer apparatus makes an error check of retrieved data which is taken as an object of transfer using the information for an error check included on a unit packet. Preferably, the data transfer apparatus of the present invention also incorporates a unit packet to which a result of an error check is described into an isochronous packet, and transfers isochronously.

As described above, in the data transfer apparatus of the present invention, while normally a data error check or retransmission are not made in a isochronous transfer, a data error check is made in addition to the original isochronous transfer and the result is isochronously transferred (with handshake). Therefore, it is realized to retransmit error data (lost data). Thus, the USB device for originally performing the bulk transfer and control transfer uses the isochronous transfer as described above, and like in the original transfer mode, a data error check can be made, based on which error data can be retransmitted. Therefore, some high rate can be guaranteed for data transfer, and the retransmission can be performed when there is a data error.

BRIEF DESCRIPTION OF THE DRAWINGS

FIG. 5 is a process flow of the data transfer according to the present invention.

FIG. 6 is a process flow of the data transfer according to the present invention.

DETAILED DESCRIPTION OF THE PREFERRED EMBODIMENTS

Figure 1:
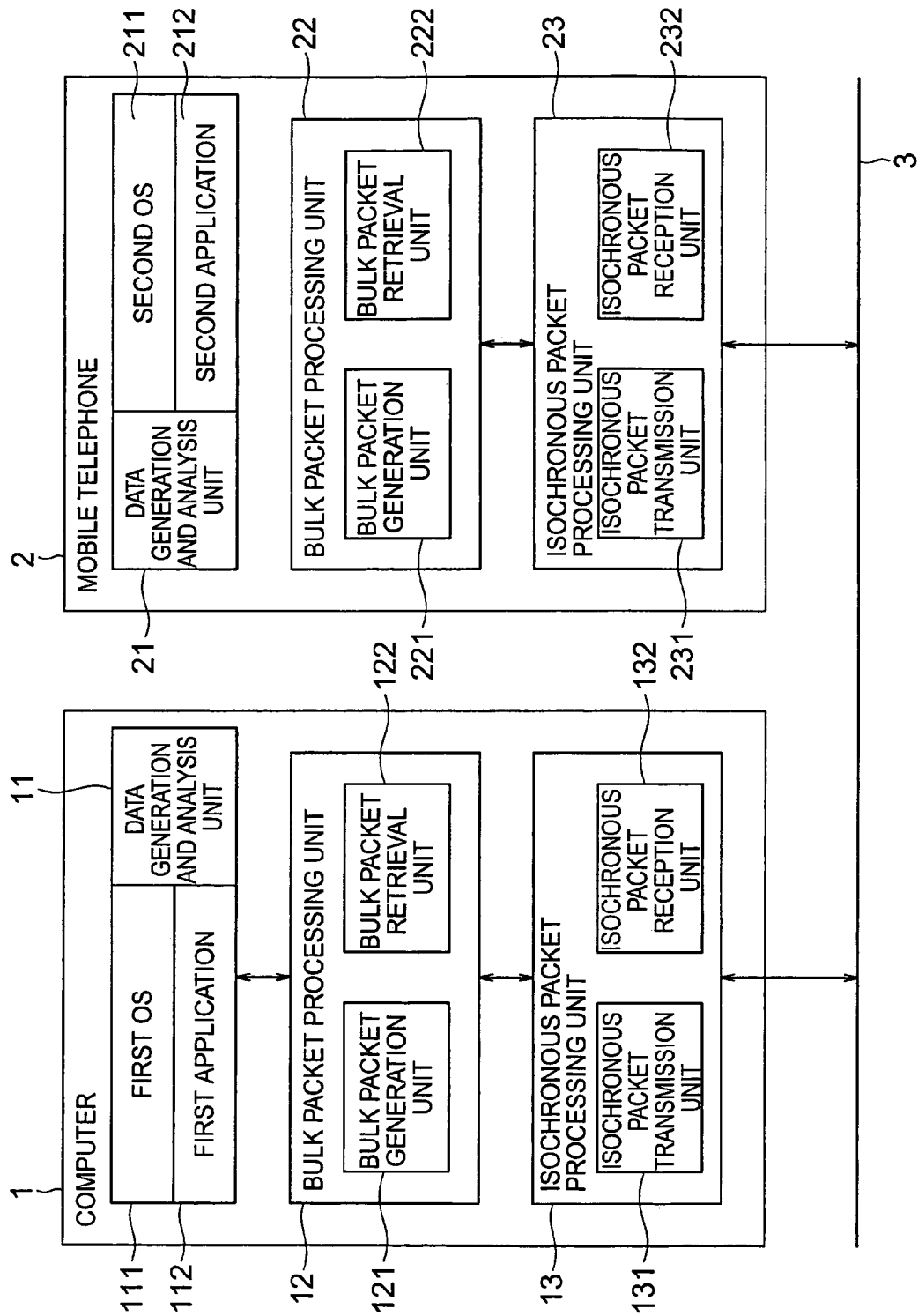
FIG. 1 shows a diagram of a data transfer apparatus according to the present invention.

FIG. 1 shows a diagram of a structure of a data transfer apparatus, and shows an example of a structure of the data transfer apparatus according to the present invention. In this example, the data transfer apparatus (data transfer system) of the present invention includes a (personal) computer 1, a mobile telephone 2, and a USB interface 3.

The computer 1 is an upstream data transfer apparatus (host), and a first data transfer apparatus. The mobile telephone 2 is a downstream data transfer apparatus or a peripheral device (target), and a second data transfer apparatus. The USB interface (USB bus) 3 is a high-speed serial interface (high-speed serial bus) for connection between them.

The computer 1 can be a CPU (central processing unit) or a hub. The mobile telephone 2 can be a digital camera, MO, CD-ROM, printer, scanner, MODEM, hard disk, flexible disk, various medium card, for example, such as a (flash) memory stick, which originally perform the bulk transfer as the USB device. Otherwise, the mobile telephone 2 can be a mouse which is the USB device for originally performing the control transfer. The USB interface 3 can be connected wirelessly.

The computer 1 includes a first data generation and analysis unit 11, a bulk packet processing unit 12 as a first unit packet processing unit, and a first isochronous packet processing unit 13. The data generation and analysis unit (or a first OS/AP) 11 generates or stores data which is taken as an object of transfer, and includes a first operating system (OS) 111 and a first application (hereinafter referred to as an application (AP)) 112. The first OS 111 is an OS for the computer 1, and controls the computer 1. The first application 112 is a program for processing various data. The bulk packet processing unit 12 processes a bulk packet, and includes a bulk packet generation unit 121 and a bulk packet retrieval unit 122. The isochronous packet processing unit 13 processes an isochronous packet into which a bulk packet is incorporated according to the present invention, and includes an isochronous packet transmission unit 131 and an isochronous packet reception unit 132.

In this example, the unit packet incorporated into an isochronous packet according to the present invention is formed by a bulk packet used in the USB bulk transfer. A unit packet can be a control packet used in the USB control transfer.

Figures 2A, 2B:
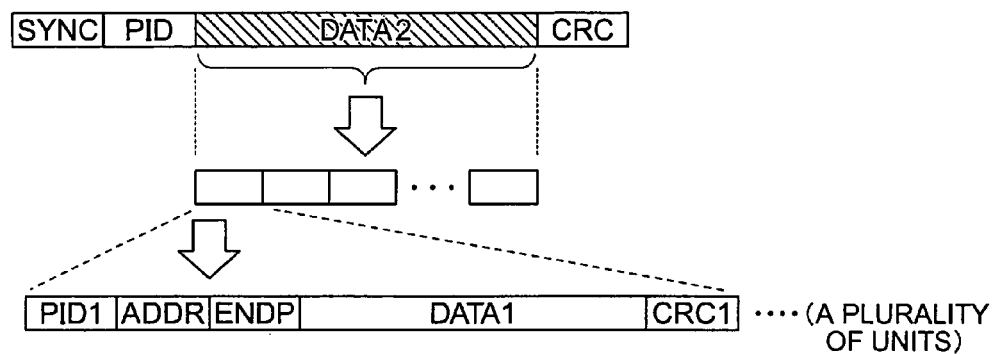
FIGS. 2A and 2B are explanatory diagrams of a data transfer process according to the present invention.

FIG. 2A shows the structure of a bulk packet and an isochronous packet. The bulk packet is a packet used in the USB bulk transfer, and has a predetermined structure including a first data area DATA1 as shown in FIG. 2A. The isochronous packet is a packet used in the USB isochronous transfer, and has a predetermined structure including a second data area DATA2 as shown in FIG. 2A.

The bulk packet includes a data transfer pattern PID1, an address ADDR, and an end point ENDP in this order, before the first data area DATA1. The bulk packet includes a first error check area CRC1 describing the information for an error check of the bulk packet, after the first data area DATA1. The control packet has substantially the same structure.

The data transfer pattern PID1 is formed by 1 byte (fixed length), and indicates whether or not the data transfer pattern (mode) of the packet is the control transfer or bulk transfer. In a case of the control transfer, it is represented by "00h". In a case of the bulk transfer, it is represented by "01h". An address ADDR is formed by 1 byte (fixed length), and indicates destination address (IP address) of the bulk packet. An end point ENDP is formed by one byte (fixed length), and indicates the destination address (IP address and a port number) of the bulk packet. The first data area DATA1 is formed by 0 byte to 64 bytes (variable length), and formed by data of the bulk packet. The first error check area CRC1 is formed by 2 bytes (fixed length), and is formed by data for check of the bulk packet by CRC.

FIG. 2B shows an example of a practical bulk packet. The data transfer pattern PID1 is "01h" since the data transfer pattern is the bulk transfer. The address ADDR indicates the destination address "0 (that is, "00h")" of the bulk packet. The end point ENDP indicates the destination address "2 (that is, "02h")" of the bulk packet. The first data area DATAL is formed by optional data to be transmitted. The first error check area CRC1 is formed by data "xxxxh" for check of the bulk packet by the CRC. Therefore, the packet is a bulk packet to be transferred to the end point "2" of the address "0". However, according to the present invention, the bulk packet is isochronously transferred to the end point of the address.

As shown in FIG. 2A, an isochronous packet includes a synchronous field SYNC and a packet identification field PID in this order, before the second data area DATA2. The isochronous packet includes a second error check area CRC2 describing the information for an error check of the isochronous packet, after the second data area DATA2.

The synchronous field SYNC is an area for synchronization in the isochronous transfer, and it is formed by 1 byte (fixed length), and has a fixed value "01h". The packet identification field PID is formed by 1 byte (fixed length), and is alternately represented by one of two values DATA#A (for example, "0") and DATA#B (for example, "1") (it is a toggle data of these two values). The second data area DATA2 is formed by 0 byte to 1024 bytes (variable length), and is formed by the data of the isochronous packet. The second error check area CRC2 is formed by 2 bytes (fixed length), and is formed by the data for check of the isochronous packet by the CRC.

The mobile telephone 2 includes a computer having a second data generation and analysis unit 21, a bulk packet processing unit 22 as a second unit packet processing unit, and a second isochronous packet processing unit 23. The data generation and analysis unit (or the second OS/AP) 21 includes a second OS 211 and a second application 212. The second OS 211 is an OS of the mobile telephone 2, and controls the mobile telephone 2. The second application 212 is a program for processing various data. The bulk packet processing unit 22 includes a bulk packet generation unit 221 and a bulk packet retrieval unit 222. The isochronous packet processing unit 23 includes an isochronous packet transmission unit 231 and an isochronous packet reception unit 232.

The mobile telephone 2 includes a structure similar to the computer 1. That is, when the second application 212 is formed by a management program for managing for example an electronic mail address and a telephone number, the first application 112 is also formed by a management program for managing an electronic mail address and a telephone number. Thus, high rate data transfer can be performed by the isochronous transfer according to the present invention between the first application 112 and the second application 212.

That is, the first application 112 generates data which is taken as an object of transfer (or to be transmitted) using a size (data length, that is, 64 bytes) of the first data area DATAL of a bulk packet as a unit of data size, for example, and transmits the data to the bulk packet generation unit 121. The first application 112 receives the retrieved data which is taken as an object of transfer (or received) from the bulk packet retrieval unit 122. The first application 112 processes the received data which is taken as an object of transfer in a predetermined operation of, for example, storing, rewriting, analyzing data, etc. Thus, the first application 112 and so on, which is a requester of data transfer can use the isochronous transfer without a heavy load and consideration of the isochronous transfer. The first application 112 and so on can use isochronously transfer data without changing the USB interface 3 or the standards of the transfer mode.

When the data which is taken as an object of transfer is larger than the size (64 bytes) of the first data area, the first application 112 divides the data which is taken as an object of transfer into a plurality of blocks, makes each block as data which is taken as an object of transfer, and transmits each of the data to the bulk packet generation unit 121 in the order. The upper limit of the size of one block is the size of the first data area DATA1. This applies to the bulk packet retrieval unit 122.

The second application 212 also performs the process similar to the process of the first application 112. Normally, the first OS 111 does not perform the bulk transfer and control transfer, but the first OS 111 may perform the bulk transfer and control transfer. This applies to the second OS 211.

The bulk packet processing unit 12 and the isochronous packet processing unit 13 has the same structure as the bulk packet processing unit 22 and the isochronous packet processing unit 23, respectively. Therefore, in the following description, the detailed explanation of the bulk packet processing unit 22 and the isochronous packet processing unit 23 is omitted.

The bulk packet generation unit 121 generates a bulk packet by describing the data which is taken as an object of transfer (to be transmitted) in the first data area DATA1. Since the first data area DATA1 is 64 bytes at maximum, the bulk packet generation unit 121 generates a necessary number of bulk packets in the order of the data, using 64 bytes as a basic unit. At this time, the bulk packet generation unit 121 sets the above-mentioned data of each area, generates the CRC information (described later) based on the contents of the first data area DATA1, and incorporates the CRC information into the first error check area CRC1, for each of bulk packets. The bulk packet generation unit 121 transmits the generated bulk packet to the isochronous packet transmission unit 131.

The isochronous packet transmission unit 131 generates an isochronous packet, and isochronously transfers the isochronous packet to (the isochronous packet reception unit 232 of) the mobile telephone 2 over the USB interface 3. The isochronous packet can be generated by incorporating at least one bulk packet into the second data area DATA2 in the order of the bulk packet. A plurality of bulk packets incorporated into the isochronous packet are the same in address ADDR and end point ENDP. That is, the isochronous transfer is performed to the same ports of the same USB devices.

Since the first data area DATA1 is 64 bytes at maximum, and the second data area DATA2 is 1024 bytes, about 15 bulk packets can be incorporated. The number of bulk packets which can be incorporated depends on the length of the first data area DATA1 of each bulk packet. When the number of generated bulk packets is so large that the generated bulk packets cannot be incorporated into one isochronous packet, a necessary number of isochronous packets are generated.

The isochronous packet reception unit 132 receives an isochronous packet isochronously transferred over the USB interface 3, and retrieves at least one bulk packet incorporated into the second data area DATA2. Since an isochronous packet has the above-mentioned structure, a bulk packet can be distinguished. When there are a plurality of bulk packets, they are retrieved in the order as they are. The isochronous packet reception unit 132 transmits the retrieved bulk packets to the bulk packet retrieval unit 122.

Before the transmission of the bulk packets to the bulk packet retrieval unit 122, the isochronous packet reception unit 132 can make an error check of the second data area DATA2 using the CRC information in the second error check area CRC. In a case that an error is detected as a result of the error check, the isochronous packet reception unit 132 can retransmit the isochronous packet to the isochronous packet transmission unit (231).

The bulk packet retrieval unit 122 retrieves data which is taken as an object of transfer (or received data) from the first data area DATA1 in a bulk packet. When there are a plurality of bulk packets, data which is taken as an object of transfer is retrieved from the respective packets in order as they are. Since a bulk packet has the above-mentioned structure, the data which is taken as an object of transfer can be distinguished from each other. Thus, the original data which is taken as an object of transfer can be obtained. The bulk packet retrieval unit 122 transmits the retrieved data which is taken as an object of transfer to the first application 112.

As described above, even a USB device for originally performing the bulk transfer (for example, the mobile telephone 2) can perform the isochronous transfer based on the bulk transfer regardless of the original transfer mode. Thus, the mobile telephone 2 can be given the opportunity to perform data transfer certainly at constant intervals (for example, once per 1 ms). Therefore, the data transfer rate of the mobile telephone 2 can be guaranteed to some extent. Additionally, a plurality of bulk packets can be incorporated into an isochronous packet. Thus, the mobile telephone 2 can increase the amount of data which can be transferred in a unit time (for example, 1 ms) as described from 512 kbps to 8 Mbps for example, and data transfer can be performed at some high rate.

Before transmitting data which is taken as an object of transfer (received data) to the first application 112, the bulk packet retrieval unit 122 makes an error check on the retrieved data which is taken as an object of transfer, using the information in the first error check area CRC1 in the retrieved data which is taken as an object of transfer. In this example, an error check is made by a CRC (Cyclic Redundancy Check), for example. Therefore, the information in the first error check area CRC1 is the information for well-known CRC (CRC information). The bulk packet retrieval unit 122 transmits a result of the error check to the bulk packet generation unit 121.

Based on the result of the error check, the bulk packet generation unit 121 generates a bulk packet for handshake. The bulk packet for handshake is a bulk packet for notification of the result of the error check, and can be generated by describing the result of the error check as the data which is taken as an object of transfer in the first data area DATA1.

The result of the error check is described as "00h" in a case that no error has been detected, for example. In a case that an error has been detected, it is described as "FFh". It is assumed that "00h" indicates ACK (notification of normal reception), and "FFh" indicates NAK (notification of abnormal reception).

The isochronous packet transmission unit 131 generates an isochronous packet for handshake, and isochronously transfers it over the USB interface 3. The isochronous packet for handshake is an isochronous packet for a notification of a result of an error check, and is generated by incorporating at least one bulk packet for handshake generated by the bulk packet generation unit 121 into the second data area DATA2. Thus, in the isochronous transfer in which a data error is not originally performed, a data error check is made and the result is isochronously transferred (handshake) after the original isochronously transfer. Therefore, a USB device (for example, a mobile telephone 2) which originally performs the bulk transfer can check a data error using the isochronous transfer as in the original transfer mode.

Figures 3A, 3B:
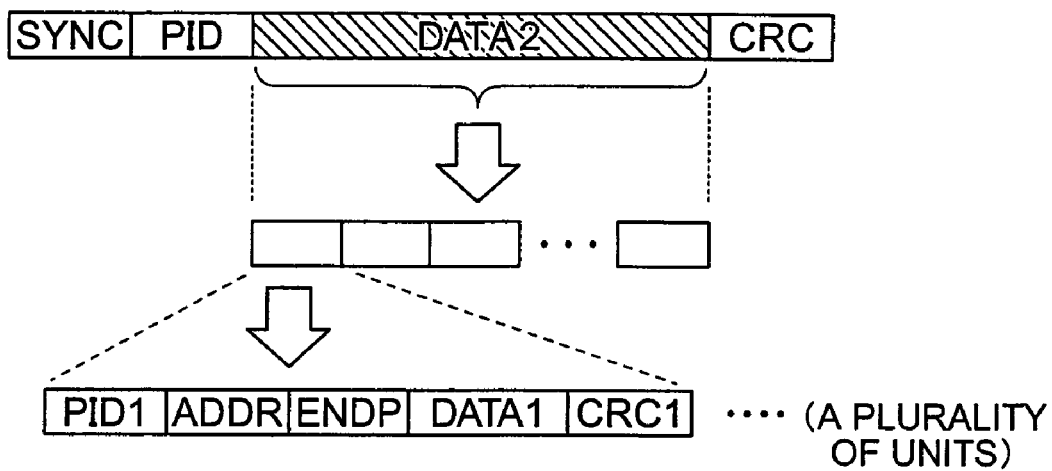
FIGS. 3A and 3B are explanatory diagrams of the data transfer process according to the present invention.

FIG. 3A shows the structure of the bulk packet and isochronous packet for handshake. They basically have the same structures with the bulk packet and the isochronous packet shown in FIG. 2A.

However, since a bulk packet for handshake is unnecessary in the original transfer mode, the load of the bulk packet processing unit 12 is reduced with the structure similar to that of the original bulk packet, and the meaning of a part of an area is changed. That is, relating to the data transferred (for example, bulk transferred) in the transfer mode to the end point of the address according to the data transfer pattern PID1, the address ADDR, and the end point ENDP, a notification of a result of an error check is announced. The bulk packet for handshake is only for a notification of a result of an error check. Therefore, the first data area DATA1 is assumed to be a small area of a fixed length. That is, the first data area DATA1 is formed by 2 bytes (fixed length).

FIG. 3B shows an example of a practical bulk packet for handshake. For example, when a bulk packet as shown in FIG. 2B is normally received, the bulk packet for handshake is prepared as follows. That is, since the packet bulk-transferred to the endpoint "2" of the address "0" is normal, the data transfer pattern PID1 is "01h" indicating the bulk transfer, and the address ADDR is "0 (that is, "00h")", and the end point ENDP is "2 (that is, "02h")", and the first data area DATA1 is ACK "00h" indicating ACK (notification of normal reception).

The isochronous packet reception unit 132 receives an isochronous packet for handshake which has been isochronously transferred, and retrieves at least one bulk packet for handshake incorporated into the second data area DATA2.

The bulk packet retrieval unit 122 retrieves a result of an error check from the first data area DATA1 of a bulk packet for handshake retrieved by the isochronous packet reception unit 132, and transmits it to the bulk packet generation unit 121. In response to this, the bulk packet generation unit 121 transmits again a bulk packet defined as an error result in the error check to the isochronous packet transmission unit 131.

The isochronous packet transmission unit 131 incorporates the bulk packet retransmitted again from the bulk packet generation unit 121 into the second data area DATA2, thereby generates an isochronous packet, and isochronously transfers the isochronous packet to the same transfer destination (that is, the same address and endpoint, for example, the mobile telephone 2) with that of the previous isochronous transfer over the USB interface 3. Thus, in the isochronous transfer in which error data is not original retransmitted, the error data can be retransmitted based on the check of the data error after the original isochronous transfer. Therefore, a USB device (for example, the mobile telephone 2) which originally performs the bulk transfer uses the isochronous transfer, and can retransmit error data as in the original transfer mode. Therefore, data transfer rate can be guaranteed at some high-rate, and retransmission can be realized in a case that a data error occurs.

Figure 4:
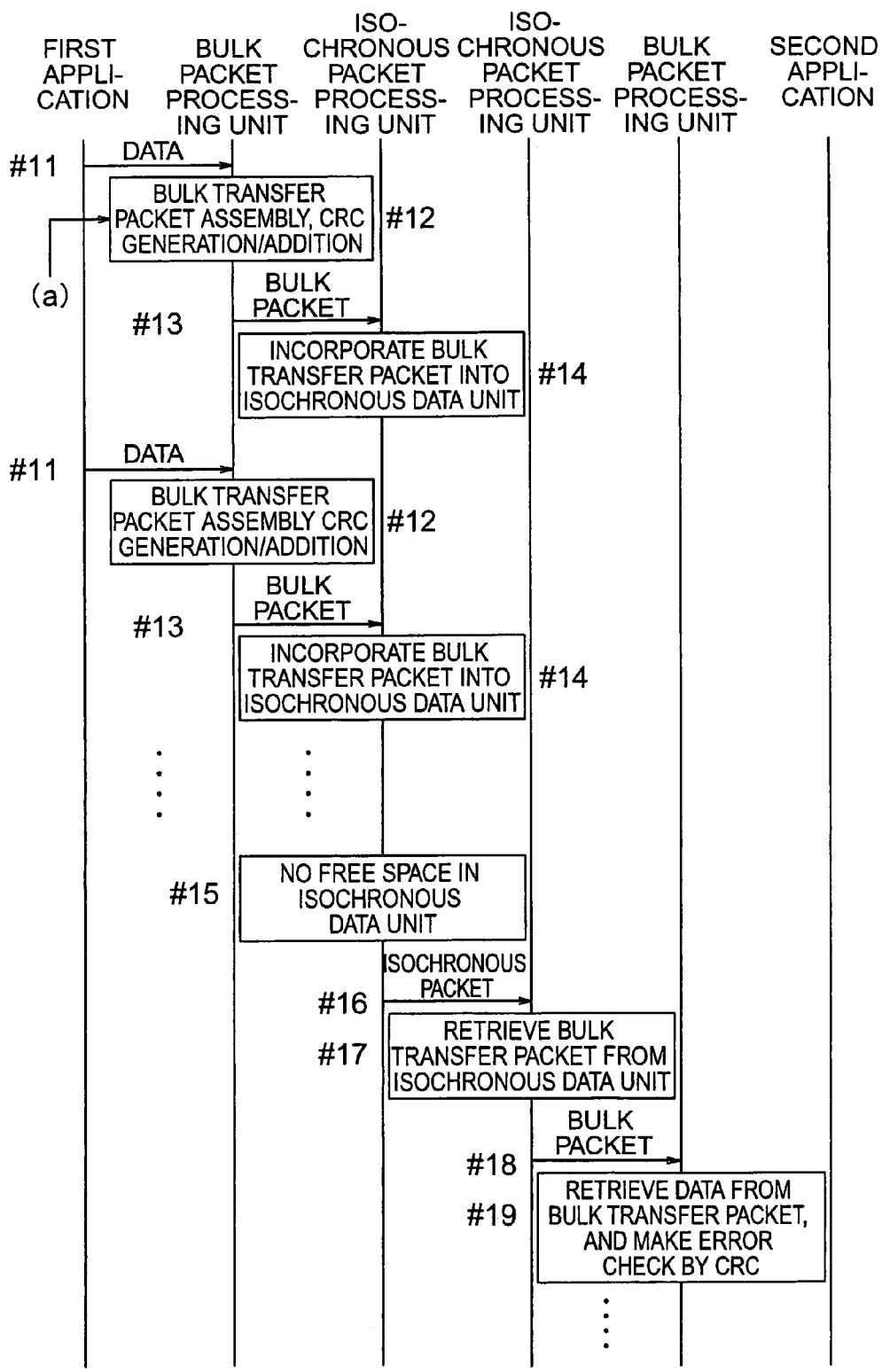
FIG. 4 is a process flow of the data transfer according to the present invention.

FIGS. 4 to 6 show a flow of the data transfer process, and shows an example of the data transfer process in the data transfer apparatus of the present invention. FIGS. 4 to 6 show the case where data is transferred (downloaded) from the computer 1 to the mobile telephone 2. Specifically, FIG. 4 shows the isochronous transfer process from the computer 1 to the mobile telephone 2, FIG. 5 shows the process in a case that e an error is detected, and FIG. 6 shows the process in a case that no error is detected. FIGS. 4 to 6 show the bi-directional flow of data, so that the bulk packet processing unit (12, 22) and the isochronous packet processing unit (13, 23) are shown.

In FIG. 4, the first application 112 of the computer 1 generates data which is taken as an object of transfer, and transmits the data with the address ADDR and the end point ENDP of the mobile telephone 2 to the bulk packet generation unit 121 (#11). The address ADDR and the end point ENDP of the mobile telephone 2 are held in advance by the first application 112. The bulk packet generation unit 121 which receives a bulk packet describes data which is taken as an object of transfer in the first data area (bulk data portion) DATA1, generates the information for an error check based on the description of the area DATA1, and describes it in the first error check area CRC1, thereby generates a bulk packet (also called a bulk transfer packet) using the above-mentioned address ADDR and the end point ENDP (#12), and transmits the packet to the isochronous packet transmission unit 131 (#13). The data transfer pattern PID1 refers to the value indicating the bulk transfer. A bulk packet is held in the bulk packet generation unit 121 for a predetermined sufficient period (for example, until reception of next isochronous transfer) for handshake and retransmission. Upon receipt of the packet, the isochronous packet transmission unit 131 incorporates a bulk packet in order from the head of the second data area (isochronous data portion) DATA2 of an isochronous packet (#14).

The processes #11 to #14 are repeated a plurality of times (n times), and a plurality of bulk packets (n pieces of bulk packet) are incorporated into an isochronous packet. When there is no free space in the second data area DATA2 of the isochronous packet (#15), the isochronous packet transmission unit 131 isochronously transfers a generated isochronous packet to the isochronous packet reception unit 232 of the mobile telephone 2 over the USB interface 3 (#16). With the timing of the isochronous transfer, the incorporation of a bulk packet is suspended at the point so that the isochronous transfer can be performed. Furthermore, when a bulk packet different in address ADDR or end point ENDP is received, a previously received bulk packet can be isochronously transferred.

The isochronous packet reception unit 232 of the mobile telephone 2 receives an isochronous packet transmitted by the mobile telephone 2, retrieves n bulk packets incorporated into the second data area DATA2 (#17), and transmits the packet to the bulk packet retrieval unit 222 (#18). Before transmitting bulk packets to the second application 212, the bulk packet retrieval unit 222 retrieves data which is taken as an object of transfer from the first data area DATA1 for each of the n bulk packets, and makes an error check by the CRC using the information in the first error check area CRC1 (#19).

In FIG. 5, when an error is detected as a result of the error check, the bulk packet retrieval unit 222 transmits it to the bulk packet generation unit 221. The bulk packet generation unit 221 generates a bulk packet for handshake by using the held address ADDR and end point ENDP and describing the result (NAK) of the error check in the first data area DATA1 (#21), and transmits the packet to the isochronous packet transmission unit 231 (#22). Upon receipt of the packet, the isochronous packet transmission unit 231 incorporates the bulk packet for handshake in order from the head of the second data area DATA2 of the isochronous packet (#23).

The processes #21 to #23 are repeated the number of times equal to the number (x) of erroneous bulk packets, for example, and the x bulk packets for handshake as a reply for the x bulk packets are incorporated into the isochronous packet. Afterwards, the isochronous packet transmission unit 231 isochronously transfers the generated isochronous packets for handshake to the isochronous packet reception unit 132 of the computer 1 over the USB interface 3 (#24).

Upon receipt of the packets, the isochronous packet reception unit 132 retrieves x bulk packets for handshake incorporated into the second data area DATA2 of the received isochronous packet for handshake (#25), and transmits them to the bulk packet retrieval unit 122 (#26). The bulk packet retrieval unit 122 retrieves the result (NAK) of the error check from the first data area DATA1 for each of the x bulk packets for handshake, and recognizes which bulk packet bulk-transferred at which address and to which endpoint is erroneous (#27). The bulk packet retrieval unit 122 transmits the result to the bulk packet generation unit 121.

Thus, the computer 1 performs again the processes #12 to #16 shown in FIG. 4 using the held data which is taken as an object of transfer as indicated by the symbol (a) shown in FIGS. 4 and 5, thereby isochronously transferring again the x bulk packets defined as erroneous packets as the result of the error check to the mobile telephone 2. Correspondingly, the mobile telephone 2 performs again the processes #17 to #19 shown in FIG. 4, and obtains the x isochronously transferred bulk packets. Thus, the x bulk packets defined as erroneous in the previous isochronous transfer can be transmitted again by taking the next opportunity of the isochronous transfer from the computer 1.

In the case shown in FIG. 5, it is necessary to indicate the order in the previous isochronous packets of the x bulk packets defined as erroneous. Therefore, for example, in the first data area DATA1, the description "NAK" indicating abnormal reception is followed (or preceded) by the description of the order. As described above, the maximum number of incorporated bulk packets is 15, so that the order is represented by 1 byte. As a result, the bulk packet for handshake becomes larger. This applies to the case shown in FIG. 6.

In FIG. 6, the bulk packet retrieval unit 222 transmits the (y) bulk packets which are not erroneous as the result of the error check to the second application 212 (#31). Afterwards, in a case that no error is detected as the result of the error check, the bulk packet retrieval unit 222 transmits the result to the bulk packet generation unit 221. The bulk packet generation unit 221 generates bulk packets for handshake by using the held address ADDR and end point ENDP and by describing the result (ACK) in the first data area DATA1 (#32), and transmits the packets to the isochronous packet transmission unit 231 (#33). Upon receipt of the packet, the isochronous packet transmission unit 231 incorporates the bulk packets for handshake in order from the head of the second data area DATA2 of the isochronous packet (#34).

The processes #31 to #33 are repeated the number of times equal to the number (y) of bulk packets which is not erroneous, for example, and the y bulk packets for handshake which is the reply for the y bulk packets are incorporated into the isochronous packets. Afterwards, the isochronous packet transmission unit 231 isochronously transfers the generated isochronous packets for handshake to the isochronous packet reception unit 132 of the computer 1 over the USB interface 3 (#35).

Upon receipt of the packet, the isochronous packet reception unit 132 retrieves y bulk packets for handshake incorporated into the second data area DATA2 of the received isochronous packet for handshake (#36), and transmits them to the bulk packet retrieval unit 122 (#37). The bulk packet retrieval unit 122 retrieves a result (ACK) of the error check from the first data area DATA1 for each of the y bulk packets for handshake, recognizes which the bulk-transferred bulk packets at which address and to which endpoint is not erroneous (#38), thereby terminating the process. Thus, the reliability of the data of the isochronously transferred bulk packet can be guaranteed.

Actually, the flows of the process shown in FIGS. 4 to 6 indicate a series of processes. That is, only the process flow shown in FIG. 4 can be performed, but it is preferable that the process flow shown in FIG. 4 can be followed by the process flows shown in FIGS. 5 and 6. The process flows shown in FIGS. 5 and 6 are practically performed in a mixed manner.

For example, when the first and second bulk packets incorporated into the same isochronous packets are respectively "not erroneous" and "erroneous", the first and second bulk packets for handshake, which are incorporated in the same isochronous packets for handshake, is set as including ACK and NAK, respectively. Thus, a plurality of bulk packets describing a result (ACK or NAK) of the error check in the corresponding order can be obtained by the isochronous transfer for each of the plurality of bulk packets incorporated into the same isochronous packet. Therefore, error data can be detected in an earlier stage, and error data can be retransmitted based on the detection in an earlier stage.

The retransmission of bulk packets which refer to error data can be similarly performed after this. For example, when the first and second bulk packets incorporated into the same isochronous packets are respectively "not erroneous" and "erroneous", the first data area DATA1 of the first bulk packet in the isochronous packet for retransmission is set as "null (1 or 2 bytes)", and the first data area DATA1 of the second bulk packet is defined as the same as the previous contents. Thus, the error data can be retransmitted at an earlier stage.

After the process flow shown in FIG. 4, any one of the process flows shown in FIGS. 5 and 6 may be performed. For example, the process flow shown in FIG. 5 may be performed immediately after the process flow shown in FIG. 4, and the process flow shown in FIG. 6 may not be performed. In this case, for the bulk packet not notified of NAK as a result of the error check in the process shown in FIG. 5, it is assumed that no error has been detected. On the other hand, the process flow shown in FIG. 6 may be performed immediately after the process flow shown in FIG. 4, and the process flow shown in FIG. 5 may not be performed. Further, in a case that there is no error in all bulk packets in one isochronous packet, the transmission of an isochronous packet for handshake may be stopped, and in the other case the isochronous packet for handshake may be transmitted.

Furthermore, the process flows shown in FIGS. 4 through 6 are one example of transmitting (isochronously transferring) data from the computer 1 to the mobile telephone 2, but the description for the transmitting from the computer 1 to the mobile telephone 2 applies to a case that data is transmitted (isochronously transferred) from the mobile telephone 2 to the computer 1. The process flows shown in FIGS. 4 to 6 are one example of transmitting (isochronously transferring) a bulk packet, but the description for the transmitting the bulk packet applies to a case that a control packet is transmitted (isochronously transferred).

As described above, according to the present invention, the data transfer apparatus performs the isochronous transfer based on the bulk transfer and control transfer regardless of the original transfer mode in the USB interface. Consequently an opportunity of data transfer can be obtained certainly at constant intervals, and the amount of data which is taken as an object of transfer can be increased. Thus, a data transfer rate can be guaranteed at some high rate, thereby preventing the USB interface from being a bottleneck in data transfer.

Additionally, according to the present invention, the data transfer apparatus makes a data error check and notifies a result of the check in the isochronous transfer. Thus, as described above, the isochronous transfer can be used and data error can be checked as in the original transfer mode, and based on the result, error data can be retransmitted. Therefore, a data transfer rate can be guaranteed at some high rate, thereby the retransmission can be performed in a case that there is a data error.

Furthermore, according to the present invention, the data transfer apparatus can guarantee a data transfer rate at some high rate without a load of an application and so on at the requester of data transfer without a change in standards of a USB interface or a transfer mode, and the retransmission can be performed when there is a data error.

What is claimed is:

1. A data transfer apparatus comprising:
a first data transfer apparatus including:
a first unit packet processing unit for generating a unit packet which is a USB packet and has a predetermined structure including a first data area by describing data which is taken as an object of transfer in the first data area; and
a first isochronous packet processing unit for generating an isochronous packet which is a packet used in USB isochronous transfer and has a predetermined structure including a second data area by incorporating at least one unit packet into the second data area, and for isochronously transferring the isochronous packet to a second data transfer apparatus over a USB interface;
a second data transfer apparatus including:
a second isochronous packet processing unit for receiving the isochronous packet isochronously transferred from the first data transfer apparatus over the USB interface, and retrieving at least one unit packet incorporated into the second data area; and a second unit packet processing unit for retrieving data which is taken as an object of transfer from the first data area included in the unit packet; and a USB interface connecting the first and second data transfer apparatuses, wherein the unit packet further includes a first error check area for description of information for an error check of the unit packet;

the isochronous packet further includes a second error check area for description of information for an error check of the isochronous packet; and the second unit packet processing unit makes an error check on the retrieved data which is taken as an object of transfer using the information in the first error check area.

2. The data transfer apparatus according to claim 1, wherein the unit packet is a bulk packet used in USB bulk transfer, or a control packet used in USB control transfer.

3. The data transfer apparatus according to claim 1, wherein the unit packet includes a data transfer pattern, an address, and an endpoint.

4. The data transfer apparatus according to claim 1, wherein the isochronous packet further comprises a synchronous field and a packet identification field.

5. The data transfer apparatus according to claim 1, wherein the second unit packet processing unit generates a unit packet which is a USB packet and has a predetermined structure including a first data area by describing a result of the error check as data which is taken as an object of transfer in the first data area; and the second isochronous packet processing unit generates an isochronous packet which is a packet used in USB isochronous transfer, and has a predetermined structure including a second data area by incorporating at least one unit packet generated by the second unit packet processing unit into the second data area, and isochronously transfers the isochronous packet over a USB interface.

6. The data transfer apparatus according to claim 5, wherein the first isochronous packet processing unit receives the isochronous packet isochronously transferred from the second isochronous packet processing unit, and retrieves at least one unit packet incorporated into the second data area;

the first unit packet processing unit retrieves the result of the error check from the first data area of the unit packet retrieved by the first isochronous packet processing unit, and transmits a unit packet which is determined as erroneous in the result of the error check to the first isochronous packet processing unit; and the first isochronous packet processing unit generates an isochronous packet by incorporating the unit packet retransmitted from the first unit packet processing unit, and isochronously transfers the isochronous packet to the second data transfer apparatus over the USB interface.

7. The data transfer apparatus according to claim 6, wherein the first data transfer apparatus further comprises a first operating system or a first application;

the second data transfer apparatus further comprises a second operating system or a second application;

the data which is taken as an object of transfer is transmitted to the first unit packet processing unit from the first operating system or the first application using a size of the first data area of the unit packet as a unit; and the retrieved data which is taken as an object of transfer is transmitted from the second unit packet processing unit to the second operating system of the second application.

* * * * *